United States Patent
Tomisaki

(10) Patent No.: US 12,179,523 B2
(45) Date of Patent: Dec. 31, 2024

(54) PNEUMATIC RADIAL TIRE FOR PASSENGER CARS

(71) Applicant: SUMITOMO RUBBER INDUSTRIES, LTD., Hyogo (JP)

(72) Inventor: Yukari Tomisaki, Kobe (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 0 days.

(21) Appl. No.: 17/997,215

(22) PCT Filed: Apr. 12, 2021

(86) PCT No.: PCT/JP2021/015177
§ 371 (c)(1),
(2) Date: Oct. 26, 2022

(87) PCT Pub. No.: WO2021/225060
PCT Pub. Date: Nov. 11, 2021

(65) Prior Publication Data
US 2023/0191834 A1    Jun. 22, 2023

(30) Foreign Application Priority Data
May 7, 2020  (JP) .................................. 2020-082030

(51) Int. Cl.
| B60C 3/04 | (2006.01) |
| B60C 1/00 | (2006.01) |
| B60C 11/00 | (2006.01) |
| B60C 11/03 | (2006.01) |
| B60C 11/12 | (2006.01) |

(52) U.S. Cl.
CPC ............. B60C 3/04 (2013.01); B60C 1/0016 (2013.01); B60C 11/005 (2013.01); B60C 11/033 (2013.01); *B60C 2011/0025* (2013.01); *B60C 2011/0353* (2013.01); *B60C 2011/0365* (2013.01); *B60C 2011/0367* (2013.01)

(58) Field of Classification Search
CPC ....... B60C 1/0016; B60C 3/04; B60C 11/005; B60C 11/033; B60C 2011/0353; B60C 2011/0025; B60C 2011/0367
See application file for complete search history.

(56) References Cited

U.S. PATENT DOCUMENTS

| 5,085,259 | A | * | 2/1992 | Goergen | ................. | B60C 11/11 |
| | | | | | | 152/902 |
| 5,479,977 | A | * | 1/1996 | Tamano | .................... | B60C 9/09 |
| | | | | | | 152/554 |
| 9,181,413 | B2 | | 11/2015 | Taguchi et al. | | |
| 11,135,877 | B2 | | 10/2021 | Kujime et al. | | |
| 11,261,314 | B2 | | 3/2022 | Kojima et al. | | |
| 2002/0092591 | A1 | * | 7/2002 | Cortes | ................ | B60C 11/0309 |
| | | | | | | 152/209.16 |
| 2013/0048169 | A1 | | 2/2013 | Erceg et al. | | |
| 2014/0011939 | A1 | | 1/2014 | Iizuka et al. | | |
| 2014/0138003 | A1 | * | 5/2014 | Kuwayama | ............... | B60C 3/04 |
| | | | | | | 152/454 |
| 2016/0090474 | A1 | * | 3/2016 | Sato | ......................... | C08L 9/00 |
| | | | | | | 523/156 |
| 2017/0087936 | A1 | | 3/2017 | Minami et al. | | |
| 2017/0197466 | A1 | | 7/2017 | Hatanaka et al. | | |
| 2018/0111424 | A1 | | 4/2018 | Tomida et al. | | |
| 2019/0193464 | A1 | | 6/2019 | Hamamura | | |
| 2020/0369087 | A1 | | 11/2020 | Matsui et al. | | |

FOREIGN PATENT DOCUMENTS

| CN | 106457924 A | 2/2017 |
| EP | 3 254 872 A1 | 12/2017 |
| EP | 2 905 149 B1 | 6/2019 |
| JP | 2000-079805 A | 3/2000 |
| JP | 2012-229285 A | 11/2012 |
| JP | 2013-107989 A | 6/2013 |
| JP | 2014-177238 A | 9/2014 |
| JP | 2015-147543 A | 8/2015 |
| JP | 2019-051896 A | 4/2019 |
| JP | 2019-093830 A | 6/2019 |
| JP | 2019-099062 A | 6/2019 |
| JP | 2019-116574 A | 7/2019 |
| JP | 2019-131756 A | 8/2019 |
| JP | 2020-006871 A | 1/2020 |
| WO | 2019/039175 A1 | 2/2019 |

OTHER PUBLICATIONS

International Search Report issued in PCT/JP2021/015177; mailed Jun. 1, 2021.
The extended European search report issued by the European Patent Office on Aug. 3, 2023, which corresponds to European Patent Application No. 21800451.3-1012 and is related to U.S. Appl. No. 17/997,215.

* cited by examiner

*Primary Examiner* — Steven D Maki
(74) *Attorney, Agent, or Firm* — Studebaker & Brackett PC

(57) ABSTRACT

Provided is a pneumatic radial tire for a passenger car that exhibits both riding comfort at low temperatures and stealing stability at high-speed running. The present invention is a pneumatic radial tire for a passenger car, in which: a carcass and a tread are provided; the tread is integrated into a standardized rim; when internal pressure is at a standardized internal pressure, the tire has a cross-sectional width Wt (mm) and an outer diameter Dt (mm) satisfying 1963.4≤ $(Dt^2\pi/4)/Wt$ ≤2827.4; the tread comprises at least one main groove in a running surface of the tread, extending in the circumferential direction of the tread; the land/sea ratio at the tread running surface is greater than 55% and less than 85%; and a rubber composition that forms the tread has a loss tangent (tan δ) which, when measured at a frequency of 10 Hz, an initial strain of 2%, and a dynamic strain rate of 1%, is such that |20° C. tan δ-50° C. tan δ| is at least 0.01 and less than 0.15, and |5° C. tan δ-20° C. tan δ| is greater than 0.15 and less than 0.70.

18 Claims, No Drawings

PNEUMATIC RADIAL TIRE FOR PASSENGER CARS

TECHNICAL FIELD

The present invention relates to a pneumatic radial tire for a passenger car, and more particularly to a radial tire for a passenger car that has both riding comfort at low temperature and steering stability at high-speed running.

BACKGROUND ART

With the increasing weight and speed of passenger cars, radial tires (hereinafter, also simply referred to as "tires") are often used as pneumatic tires for passenger cars.

This radial tire generally has a carcass with a radial arrangement code that straddles a pair of bead portions in a toroidal shape, and a tread provided on the outer side of the carcass in the tire radial direction. The radial tire is molded in consideration of fuel efficiency, and comfort in the car while driving.

Regarding such radial tires, it is increasingly required to achieve both a comfortable ride quality and stable maneuvering performance (steering stability) in passenger cars equipped with tires, from the viewpoint of recent environmental problems and safety measures.

Therefore, in order to meet such requirements, examination of the composition of the rubber composition constituting the tread (for example, Patent Documents 1 and 2) and examination of the tread pattern (for example, Patent Documents 3 and 4) are carried out.

PRIOR ART DOCUMENTS

Patent Document

[Patent Document 1] JP2012-229285A
[Patent Document 2] JP2013-107989A
[Patent Document 3] JP2014-177238A
[Patent Document 4] JP2015-147543A

SUMMARY OF INVENTION

Problem to be Solved by the Invention

However, the above-mentioned conventional techniques are not yet sufficient in terms of both riding comfort and steering stability. Particularly, radial tires that have both riding comfort at low temperatures and steering stability at high-speed running are desired.

Therefore, an object of the present invention is to provide a pneumatic radial tire for a passenger car that has both riding comfort at low temperature and steering stability at high-speed running.

Means for Solving the Problem

The present inventor has diligently studied the solution to the above-mentioned problem, found that the above-mentioned problem can be solved by the invention described below, and has completed the present invention.

The invention according to one embodiment is;
a pneumatic radial tire for a passenger car including a carcass having a radial arrangement code straddling a pair of bead portions in a toroidal shape and a tread provided on the outer side of the carcass in the radial direction of the tire, in which the tread satisfies, when the tire is installed on a standardized rim and the internal pressure is the standardized internal pressure, the cross-sectional width of the tire is Wt (mm) and the outer diameter is Dt (mm), $1963.4 \leq (Dt^2 \times \pi/4)/Wt \leq 2827$, and has at least one main groove extending in the circumferential direction of the tread on the tread running surface;

the land/sea ratio on the tread running surface is more than 55% and less than 85%; and regarding loss tangent (tan δ) of the rubber composition forming the tread measured under the conditions of a frequency of 10 Hz, an initial strain of 2%, and a dynamic strain rate of 1%,

|120° C. tan δ-50° C. tan δ| is 0.01 or more and less than 0.15, and

|5° C. tan δ-20° C. tan δ| is more than 0.15 and less than 0.70.

The invention according to another embodiment is;
the |20° C. tan δ-50° C. tan δ| is more than 0.08 and less than 0.12.

The invention according to another embodiment is;
the |5° C. tan δ-20° C. tan δ| is more than 0.30 and less than 0.40.

The invention according to another embodiment is;
the tread is divided into four or more regions in the tire axial direction by the three or more main grooves and a pair of ground contact ends; and
the difference in the average tread area per unit length in the tire circumferential direction is 15% or less in each of the four or more regions.

The invention according to another embodiment is;
the tread is divided into a center land region and both shoulder land regions by a pair of shoulder main grooves extending continuously along the tire circumferential direction across the center line passing through the axial center of the tread pattern;
the shoulder main groove has a groove width of more than 4 mm and less than 20 mm, and the center of the groove width is on the center side of the 25% width position of the ground contact width from the tread ground contact end; and
the center land area has an area of 40% or more of the entire land area of the tire contact area.

The invention according to another embodiment is;
the tread is composed of a cap rubber layer constituting the tread running surface and a base rubber layer located inside the cap rubber layer;
the hardness of the cap rubber layer is higher than the hardness of the base rubber layer, and has the JIS A hardness of more than 45 and less than 75.

The invention according to another embodiment is;
the rubber composition forming the tread contains 35% by mass or more of diene-based rubber as a rubber component; and
35 parts by mass or more, with respect to 100 parts by mass of the rubber component, of silica having a BET specific surface area of more than 140 m²/g and less than 250 m²/g.

The invention according to another embodiment is;
the center land region is provided with a lateral groove and/or a lateral sipe extending in a direction crossing the land portion.

The invention according to another embodiment is;
when the outer diameter of the tire is Dt (mm) and the cross-sectional height of the tire is Ht (mm), (Dt−2×Ht)

is 470 (mm) or more, when the tire is installed on a standardized rim and the internal pressure is 250 kPa.

The invention according to another embodiment is; the aspect ratio is 40% or more.

The invention according to another embodiment is; the aspect ratio is 45% or more.

The invention according to another embodiment is; the aspect ratio is 47.5% or more.

The invention according to another embodiment is; the aspect ratio is 50% or more.

The invention according to another embodiment is; the ratio of $L_{80}$, the groove width at a depth of 80% of the maximum depth of the main groove extending in the circumferential direction of the tread, to $L_0$, the groove width of the main groove on the contact area of the main groove ($L_{80}/L_0$) is 0.3 to 0.7.

The invention according to another embodiment is; the tread is divided into a center land region and both shoulder land regions by a pair of shoulder main grooves extending continuously along the tire circumferential direction across the center line passing through the axial center of the tread pattern, and has multiple lateral grooves extending in the tire axial direction; and the total volume of the plurality of lateral grooves is 2.0 to 5.0% of the volume of the tread.

The invention according to another embodiment is; at least one of the lateral grooves is a lateral groove having a groove width/groove depth of 0.50 to 0.80.

The invention according to another embodiment is; when the outer diameter of the tire is Dt (mm) when the tire is installed on a standardized rim and the internal pressure is 250 kPa, the Dt is less than 685 (mm).

The invention according to another embodiment is; the cross-sectional width Wt (mm) is less than 205 mm.

The invention according to another embodiment is; the cross-sectional width Wt (mm) is less than 200 mm.

The Effect of the Invention

According to the present invention, it is possible to provide a pneumatic radial tire for a passenger car that has both riding comfort at low temperature and steering stability at high-speed running.

EMBODIMENTS FOR CARRYING OUT THE INVENTION

Hereinafter, the present invention will be specifically described based on the embodiments.

[1] Features of the Tire of the Present Invention

First, the features of the tire according to the present invention will be described.

The present inventor considered that the shape of the tread and the physical properties of the rubber are related to both the riding comfort at low temperature and the steering stability at high-speed running, and each of them needs to satisfy certain conditions. Various experiments and studies were carried out, and it was found that the tread needs to have the shape and the physical properties of the rubber shown below in order to solve the above-mentioned problems. Thus, the present invention was completed.

Specifically, first, regarding the shape of the tread, it was found that, when the cross-sectional width of the tire is Wt (mm) and the outer diameter is Dt (mm) when the tire is installed on the standardized rim and the internal pressure is the standardized internal pressure, it is necessary to satisfy $1963.4 \leq (Dt^2 \times \pi/4)/Wt \leq 2827.4$, and to have at least one main groove extending in the circumferential direction of the tread on the tread running surface, and to be molded so that a land/sea ratio on the tread running surface is more than 55% and less than 85%.

Next, regarding the physical properties of rubber of the tread, for loss tangent (tan δ) measured under the conditions of a frequency of 10 Hz, an initial strain of 2%, and a dynamic strain rate of 1%, it is necessary that |20° C. tan δ-50° C. tan δ| is 0.01 or more and less than 0.15, and |5° C. tan δ-20° C. tan δ| is more than 0.15 and less than 0.70, and it was found that it is necessary to use the rubber composition formulated to exhibit such the physical properties of rubber.

As described above, since the tread has an appropriate shape and rubber physical properties, it is possible to provide a tire having both riding comfort at low temperature and steering stability at high-speed running.

That is, by forming the tread in the shape as described above, a sufficient contact area of the tire can be secured. On the other hand, since the tread has the rubber physical properties as described above, the hardness of the tread rubber can be appropriately maintained and the change in the tread shape during running can be sufficiently suppressed. In the tire according to the present invention, the effect based on the shape of the tread and the effect based on the physical properties of the tread rubber are synergistically exerted, so that the optimized tread ground contact shape can be maintained even when driving at high speeds or at low temperatures, and it is possible to achieve both riding comfort at low temperature and steering stability at high-speed running.

[2] Embodiment of the Present Invention

Hereinafter, the present invention will be specifically described based on the embodiments.

1. Tread Shape

As described above, the tire of the present embodiment is a pneumatic radial tire for a passenger car which first has a carcass of a radial arrangement cord straddling a pair of bead portions in a toroidal shape, and a tread provided on the outer side of the carcass in the tire radial direction.

In the present embodiment, the passenger car tire refers to a tire mounted on a vehicle running on four wheels and having a maximum load capacity of 1000 kg or less. Here, the maximum load capacity is the maximum load capacity defined for each tire in the standard system including the standard on which the tire is based. For example, in the case of JATMA standard (Japan Automobile Tire Association standard), it is the maximum load capacity based on load index (LI); in the case of TRA (The Tire and Rim Association, Inc.), it is the maximum value described in "TIRE LOAD LIMITS AT VARIOUS COLD INFRATION PRESSURES"; and in the case of ETRTO, it is "INFRATION PRESSURE".

When the cross-sectional width of the tire is Wt (mm) and the outer diameter is Dt (mm), when the tire of the present embodiment is installed on a standardized rim, the internal pressure is the standardized internal pressure, $1963.4 \leq (Dt)^2 \times \pi/4)/Wt \leq 2827.4$ is satisfied.

The above formula indicates that the tire has a larger area when viewed from the lateral direction, $[(Dt/2)^2 \times \pi) = (Dt^2 \times \pi/4)]$, with respect to the cross-sectional width Wt of the tire than the conventional tire. By satisfying the numerical range specified by the formula, the moment of inertia at the time of rolling of the tire becomes large, and the steering stability can be improved.

In the above description, the "standardized rim" is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design-Rim" described in "YEAR BOOK". In the case of tires that are not specified in the standard, it refers a rim that can be assembled and can maintain internal pressure, that is, the rim that does not cause air leakage from between the rim and the tire, and has the smallest rim diameter, and then the narrowest rim width.

The "standardized internal pressure" is the air pressure defined for each tire by the standard. In the case of JATMA, it is the maximum air pressure, in the case of TRA, it is the maximum value described in the table "TIRE LOAD LIMITS AT VARIOUS COLD INFLATION PRESSURES", and in the case of ETRTO, it is "INFLATION PRESSURE".

The outer diameter Dt of the tire is the outer diameter of the tire in a state where the tire is assembled to a standardized rim, the internal pressure is 250 kPa (standardized internal pressure in a passenger car tire), and no load is applied. The cross-sectional width Wt (mm) of the tire is the width of tire in a state where the tire is assembled to a standardized rim, the internal pressure is 250 kPa (standardized internal pressure in a passenger car tire), and no load is applied, and excluding patterns, letters, and the like on the tire side from the linear distance between the sidewalls (total width of the tire) including all the patterns, letters and the like on the tire side.

Further, in the present embodiment, the tread running surface has at least one main groove (circumferential main groove) extending in the circumferential direction of the tread.

By providing such a circumferential main groove on the tread running surface, it is possible to secure a stable ride quality while sufficiently securing the contact area of the tire.

In the above description, the "tread running surface" refers to the outer peripheral surface of a tire that comes to contact with the road surface when the tire is assembled to a standardized rim, a standardized internal pressure is applied, and the tire is rolled under a load of a standardized load. The "standardized load" is the load defined for each tire in the standard on which the tire is based in the standard system including the standard, and refers to the maximum mass that can be loaded on the tire. In the case of JATMA, it is the maximum load capacity; in the case of TRA, it is the maximum value described in the table "TIRE LOAD LIMITS AT VARIOUS COLD INFLATION PRESSURES"; and in the case of ETRTO, it is "LOAD CAPACTY".

The "circumferential main groove" refers to a groove having a cross-sectional area of 10 mm$^2$ or more in the tire width direction. The circumferential main groove formed in the central portion of the tread in the width direction is called the crown main groove, and the circumferential main groove formed at the widthwise end of tread is called the shoulder main groove.

Further, in the present embodiment, the tread is molded so that the land/sea ratio on the tread running surface is to be more than 55% and less than 85%. The "land/sea ratio" is the ratio between the land area (total surface area of the ground contact portion) and the sea area (the area of the entire groove bottom surface) on the tread running surface.

By providing the above-mentioned circumferential main groove and controlling the land/sea ratio on the tread running surface to be within the above range, it is possible to secure a sufficient contact area of the tire and to secure a stable riding comfort.

2. Tread Rubber Composition

Next, in the tire of the present embodiment, the tread is formed by using a rubber composition formulated so that, for loss tangent (tan δ) measured under the conditions of a frequency of 10 Hz, an initial strain of 2%, and a dynamic strain rate of 1%, |20° C. tan δ-50° C. tan δ| is 0.01 or more and less than 0.15, and |5° C. tan δ-20° C. tan δ| is more than 0.15 and less than 0.70.

In the above, the tan δ is, for example, a loss tangent measured at 5° C., 20° C. and 50° C., using a viscoelasticity measuring device of "Iplexer (registered trademark)" manufactured by GABO, under the conditions of a frequency of 10 Hz, an initial strain of 2%, and a dynamic strain rate of 1%.

The above |20° C. tan δ-50° C. tan δ| is more preferably more than 0.08 and less than 0.12, and |5° C. tan δ-20° C. tan δ| is more preferably more than 0.30 and less than 40.

By using a tire provided with a tread having the above-mentioned shape and rubber properties, it is possible to optimize the ground contact shape of the tread of the tire at a low temperature or a high-speed running, and both riding comfort at low temperature and steering stability at high-speed running can be achieved at a high level.

3. Preferred Aspects of the Tread

In the present embodiment, it is more preferred that the tread is formed as follows.

(1) First, the tread is divided into four or more regions in the tire axial direction by three or more main grooves and a pair of ground contact ends, and in each region of the four or more regions, the difference in the average tread area per unit length (10 cm) in the tire circumferential direction is preferably 15% or less. As a result, the ground contact surface of the tread can be brought into contact with the road surface more sufficiently, so that the riding comfort at low temperature and the steering stability at high-speed running can be achieved at a higher level.

Specifically, first, the tread is divided into four or more regions in the tire axial direction by three or more main grooves. Since this region is a region partitioned in the tire axial direction, each region is formed in the circumferential direction.

Then, focusing on a region formed in one circumferential direction, when the average tread area of the unit length (10 cm) in the tire circumferential direction is measured from a certain position, then the average tread area of the unit length (10 cm) in the tire circumferential direction is measured from another position, and the measurement results of both are compared, the difference between both is set to be 15% or less. The above can be said regardless of the position of the measurement, and the difference in the average tread area per unit length is 15% or less regardless of the position of the measurement.

The above is same not only in one circumferential region but also in each region of four or more regions.

(2) Then, in the present embodiment, the tread is divided into a center land area and both shoulder land areas by a pair of extending shoulder main grooves extending continuously along the tire circumferential direction with the center of the tread pattern in the tire axial direction, that is, the center line passing through the center of the tread pattern in the tire axial direction. It is preferred that the shoulder main groove has a groove width of more than 4 mm and less than 20 mm, and is located on the center side of the 25% width position of the ground contact width from the tread ground contact end, and the center land area has an area of 40% or more of the entire land area of the tire contact area. As a result, the ground contact surface of the tread can be brought into contact with the road surface more sufficiently, so that the riding comfort at low temperature and the steering stability at high-speed running can be achieved at a higher level.

Here, the "ground contact end" refers to the outer end in the tire axial direction in the "tread contact width", and the "tread contact width" refers to the maximum linear distance in the tire axial direction on the contact surface with the flat plate, when the tire is installed on the "standardized rim", filling the "standardized internal pressure", the tire was placed stationary on a flat plate in a vertical position, and a load corresponding to the "standardized load" is applied.

(3) Further, in the present embodiment, the tread is composed of a cap rubber layer constituting the tread running surface and a base rubber layer located inside the cap rubber layer, and the hardness of the cap rubber layer is preferably higher than the hardness of the base rubber layer and preferably has a JIS A hardness of more than 45 and less than 75.

In this way, when the tread is formed into a two-layer structure of a cap rubber layer and a base rubber layer, and the hardness of the cap rubber layer is higher than the hardness of the base rubber layer, which is more than 45 and less than 75 in JIS A hardness, the hard cap rubber layer can ensure stability at high speeds, while the soft base rubber layer absorbs the impact. As a result, it is possible to achieve both the riding comfort at low temperature and the steering stability at high-speed running can be achieved at a higher level.

(4) Further, in the present embodiment, it is preferred that the center land area of the tread is provided with a lateral groove and/or a lateral sipe extending in a direction crossing the land portion.

By providing such lateral grooves and/or lateral sipes, it is possible to maintain wear resistance in the center land region of the tread and enhance the durability of the tire.

In the present embodiment, considering the stability of riding comfort during running, the outer diameter Dt (mm) of the tire and the cross-sectional height of the tire Ht (mm) (the distance from the bottom surface of the bead to the top surface of the tread, which is ½ of the difference between the outside diameter of the tire and the nominal rim diameter) of the tire, in a state where the internal pressure is 250 kPa and no load is applied, preferably satisfy that (Dt−2×Ht) is 450 (mm) or more, and 470 (mm) or more is more preferable, and 480 (mm) or more is further preferable. On the other hand, considering the deformation of the tread portion, it is preferably less than 560 (mm), more preferably less than 530 (mm), and even more preferably less than 510 (mm).

Considering the durability of the tire, it is preferable that the aspect ratio of the tire in the present embodiment is 40% or more.

The aspect ratio (%) described above can be obtained by the following formula using the cross-sectional height Ht (mm) and the cross-sectional width Wt (mm) of the tire when the internal pressure is 250 kPa.

$$(Ht/Wt) \times 100(\%)$$

The aspect ratio is more preferably 45% or more, and further preferably 47.5% or more. Further, it is further more preferably 50% or more, particularly preferably 52.5% or more, and most preferably 55% or more.

Further, it is preferred that the ratio of the groove width $L_{80}$ at a depth of 80% of the maximum depth of the main groove to the groove width $L_0$ of the main groove on the contact area of the main groove ($L_{80}/L_0$) is preferably 0.3 to 0.7. As a result, the movement of the entire land portion can be suppressed at the bottom surface of the land portion of the tread portion, and the stability of the riding comfort can be improved. The ratio is more preferably 0.35 to 0.65, further preferably 0.40 to 0.60, and particularly preferably 0.45 to 0.55.

The above-mentioned $L_0$ and $L_{80}$ refer to the linear distance ($L_0$) between the groove edges on the tread surface of the tread circumferential main groove of a tire in a state where the tire is installed on a standardized rim, the internal pressure is 250 kPa, and no load is applied, and to the minimum distance ($L_{80}$) between the groove walls at a position where the groove depth is 80%, respectively. To put it simply, they can be obtained by putting the bead portion of the section cut out in the radial direction with a width of 2 to 4 cm in a pressed state according to the rim width.

Further, in the present embodiment, the tread is divided into a center land region and both shoulder land regions by a pair of shoulder main grooves extending continuously along the tire circumferential direction across the center line passing through the center portion of the tread pattern in the tire axial direction, and has multiple lateral grooves extending in the tire axial direction. The total volume of the multiple lateral grooves is preferably 2.0 to 5.0% of the volume of the tread. As a result, it is possible to suppress the movement of the tread portion and achieve both riding comfort and steering stability. It is more preferably 2.2 to 4.0%, further preferably 2.5 to 3.5%, and particularly preferably 2.7 to 3.0%.

The volume of the lateral groove described above refers to the total volume of the volume composed of the surface connecting the ends of the lateral groove and the groove wall in a tire installed on a standardized rim, having an internal pressure of 250 kPa and in a no-load state. To put it simply, it can be obtained by calculating the volume of each lateral groove and multiplying it by the number of grooves, in a state where the bead portion of the section cut out in the radial direction with a width of 2 to 4 cm is pressed down according to the rim width. Further, the volume of the tread portion can be calculated by calculating the area of the tread portion not including the lateral groove from the section and multiplying it by the outer diameter, then obtaining the difference between the calculation result and the volume of the lateral groove.

From the viewpoint of suppressing uneven wear of the tread and improving durability, it is preferred that at least one of these lateral grooves has a groove width ratio (Gw/Gd), ratio of groove width Gw to groove depth Gd, of 0.50 to 0.80. The ratio is more preferably 0.53 to 0.77, further preferably 0.55 to 0.75, and particularly preferably 0.60 to 0.70.

The groove width and groove depth of the lateral groove described above refer to the maximum length of the straight lines connecting the tread surface ends of the lateral groove, which are perpendicular to the groove direction, and to the maximum depth of the lateral groove, respectively, in the tire in a state where the internal pressure is 250 kPa and no load is applied. To put it simply, it can be calculated in a state where the bead portion of the section cut out in the radial direction with a width of 2 to 4 cm is put down in a pressed state according to the rim width.

In the tire according to the present invention, when the tire is assembled to a standardized rim and the internal pressure is 250 kPa, the specific outer diameter Dt (mm) is preferably, for example, 515 mm or more. It is more preferably 558 mm or more, further preferably 585 mm, particularly preferably 658 mm or more, and most preferably 673 mm or more. On the other hand, it is preferably less than 843 mm, more preferably less than 725 mm, further preferably less than 707 mm, particularly preferably less than 685 mm, and most preferably less than 675 mm.

The specific cross-sectional width Wt (mm) is, for example, preferably 115 mm or more, more preferably 130 mm or more, further preferably 150 mm or more, still more preferably 170 mm or more, and even more preferably 185 mm, and most preferably 193 mm or more. On the other hand, it is preferably less than 305 mm, more preferably less than 245 mm, further preferably less than 210 mm, particularly preferably less than 205 mm, and most preferably less than 200 mm.

The specific cross-sectional height Ht (mm) is, for example, preferably 37 mm or more, more preferably 87 mm or more, and further preferably 95 mm or more. On the other hand, it is preferably less than 180 mm, more preferably less than 112 mm, and even more preferably less than 101 mm.

4. Tread Rubber

As described above, in the tread rubber of tire of the present embodiment, the tread is formed by using a rubber composition which is compounded so that, regarding loss tangent (tan δ) of the rubber composition forming the tread measured under the conditions of a frequency of 10 Hz, an initial strain of 2%, and a dynamic strain rate of 1%, |20° C. tan δ-50° C. tan δ| is 0.01 or more and less than 0.15, and |5° C. tan δ-20° C. tan δ| is more than 0.15 and less than 0.70.

(1) Tread Rubber Composition

A rubber composition having such rubber properties can be obtained from the rubber components described below and other compounding materials. Particularly, by adjusting the type and amount of rubber component, the type and amount of silica, the type and amount of carbon black, the type and amount of plasticizer, and the amount of sulfur, desired rubber physical properties can be easily realized.

(A) Rubber Component

As the rubber component, it is preferred that the diene-based rubber is contained in an amount of 35% by mass or more. Examples of specific diene rubbers include natural rubber (NR), isoprene-based rubber, butadiene rubber (BR), styrene butadiene rubber (SBR), acrylonitrile butadiene rubber (NBR), chloroprene rubber (CR), butyl rubber (IIR), and styrene-isoprene-butadiene copolymer rubber (SIBR). These may be used alone or in combination of two or more.

(B) Isoprene-Based Rubber

When the rubber composition contains isoprene-based rubber, the content (total content) of the isoprene-based rubber in 100% by mass of the rubber component is, for example, more than 5% by mass and less than 100% by mass. Examples of the isoprene-based rubber include natural rubber (NR), isoprene rubber (IR), reformed NR, modified NR, and modified IR.

As the NR, for example, SIR20, RSS #3, TSR20 and the like, which are common in the tire industry, can be used. The IR is not particularly limited, and for example, IR 2200 and the like, which are common in the tire industry, can be used. Reformed NR includes deproteinized natural rubber (DPNR), high-purity natural rubber (UPNR), and the like. Modified NR includes epoxidized natural rubber (ENR), hydrogenated natural rubber (HNR), grafted natural rubber, and the like. Modified IR includes epoxidized isoprene rubber, hydrogenated isoprene rubber, grafted isoprene rubber, and the like. These may be used alone or in combination of two or more.

(B) SBR

When the rubber composition contains SBR, the content of SBR in 100% by mass of the rubber component is, for example, more than 5% by mass and less than 100% by mass. The weight average molecular weight of SBR is, for example, more than 100,000 and less than 2 million. The amount of styrene in SBR is, for example, more than 5% by mass and less than 50% by mass. The amount of vinyl (1,2-bonded butadiene unit amount) of SBR is, for example, more than 5% by mass and less than 70% by mass. The structure identification of SBR (measurement of the amount of styrene and the amount of vinyl) can be performed, for example, by using an apparatus of the JNM-ECA series manufactured by JEOL Ltd.

The SBR is not particularly limited, and for example, emulsion-polymerized styrene-butadiene rubber (E-SBR), solution-polymerized styrene-butadiene rubber (S-SBR) and the like can be used. The SBR may be either a non-modified SBR or a modified SBR.

The modified SBR may be any SBR having a functional group that interacts with a filler such as silica. Examples thereof include end-modified SBR (end-modified SBR having the above functional group at the terminal) in which at least one end of the SBR is modified with a compound having the above functional group (modifying agent), main chain modified SBR having the functional group in the main chain, main chain terminal modified SBR having the functional group at the main chain and the terminal (for example, a main chain terminal modified SBR having the above functional group to the main chain and having at least one end modified with the above modifying agent, and end-modified SBR which is modified (coupled) with a polyfunctional compound having two or more epoxy groups in the molecule, and into which an epoxy group or hydroxyl group has been introduced, Examples of the functional group include an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, and an epoxy group. In addition, these functional groups may have a substituent.

Further, as the modified SBR, for example, an SBR modified with a compound (modifying agent) represented by the following formula can be used.

[Chemical 1]

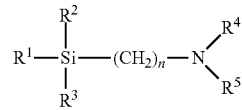

In the formula, R1, R2 and R3 are the same or different and represent alkyl group, alkoxy group, silyloxy group, acetal group, carboxyl group (—COOH), mercapto group (—SH) or derivatives thereof. R4 and R5 are the same or different and represent hydrogen atoms or alkyl group. R4 and R5 may be combined to form a ring structure with nitrogen atoms. n represents an integer.

As the modified SBR modified by the compound (modifying agent) represented by the above formula, SBR, in which the polymerization end (active end) of the solution-polymerized styrene-butadiene rubber (S-SBR) is modified by the compound represented by the above formula (for example, modified SBR described in JP-A-2010-111753), can be used.

As R1, R2 and R3, an alkoxy group is suitable (preferably an alkoxy group having 1 to 8 carbon atoms, more preferably an alkoxy group having 1 to 4 carbon atoms). As R4 and R5, an alkyl group (preferably an alkyl group having 1 to 3 carbon atoms) is suitable. n is preferably 1 to 5, more preferably 2 to 4, and even more preferably 3. Further, when R4 and R5 are combined to form a ring structure together with a nitrogen atom, a 4- to 8-membered ring is preferable. The alkoxy group also includes a cycloalkoxy group (cyclohexyloxy group, and the like) and an aryloxy group (phenoxy group, benzyloxy group, and the like).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as the modified SBR, a modified SBR modified with the following compound (modifying agent) can also be used. Examples of the modifying agent include
  polyglycidyl ethers of polyhydric alcohols such as ethylene glycol diglycidyl ether, glycerin triglycidyl ether, trimethylolethanetriglycidyl ether, and trimethylolpropane triglycidyl ether;
  polyglycidyl ethers of aromatic compounds having two or more phenol groups such as diglycidylated bisphenol A; polyepoxy compounds such as 1,4-diglycidylbenzene, 1,3,5-triglycidylbenzene, and polyepoxidized liquid polybutadiene;
  epoxy group-containing tertiary amines such as 4,4'-diglycidyl-diphenylmethylamine, and 4,4'-diglycidyl-dibenzylmethylamine;
  diglycidylamino compounds such as diglycidylaniline, N,N'-diglycidyl-4-glycidyloxyaniline, diglycidyl orthotoluidine, tetraglycidylmethoxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;
  amino group-containing acid chlorides such as bis-(1-methylpropyl) carbamate chloride, 4-morpholincarbonyl chloride, 1-pyrrolidincarbonyl chloride, N,N-dimethylcarbamide acid chloride, and N,N-diethylcarbamide acid chloride;
  epoxy group-containing silane compounds such as 1,3-bis-(glycidyloxypropyl)-tetramethyldisiloxane, and (3-glycidyloxypropyl)-pentamethyldisiloxane;
  sulfide group-containing silane compound such as (trimethylsilyl) [3-(trimethoxysilyl) propyl] sulfide, (trimethylsilyl) [3-(triethoxysilyl) propyl] sulfide, (trimethylsilyl) [3-(tripropoxysilyl) propyl] sulfide, (trimethylsilyl) [3-(tributoxysilyl) propyl] sulfide, (trimethylsilyl) [3-(methyldimethoxysilyl) propyl] sulfide, (trimethylsilyl) [3-(methyldiethoxysilyl) propyl] sulfide, (trimethylsilyl) [3-(methyldipropoxysilyl) propyl] sulfide, and (trimethylsilyl) [3-(methyldibutoxysilyl) propyl] sulfide;
  N-substituted aziridine compound such as ethyleneimine and propyleneimine;
  alkoxysilanes such as methyltriethoxysilane, N,N-bis (trimethylsilyl)-3-aminopropyltrimethoxysilane, N,N-bis (trimethylsilyl)-3-aminopropyltriethoxysilane, N,N-bis (trimethylsilyl) aminoethyltrimethoxysilane, and N,N-bis (trimethylsilyl) aminoethyltriethoxysilane;
  (thio) benzophenone compound having an amino group and/or a substituted amino group such as 4-N,N-dimethylaminobenzophenone, 4-N,N-di-t-butylaminobenzophenone, 4-N,N-diphenylamino benzophenone, 4,4'-bis (dimethylamino) benzophenone, 4,4'-bis (diethylamino) benzophenone, 4,4'-bis (diphenylamino) benzophenone, and N,N,N',N'-bis-(tetraethylamino) benzophenone;
  benzaldehyde compounds having an amino group and/or a substituted amino group such as 4-N,N-dimethylaminobenzaldehyde, 4-N,N-diphenylaminobenzaldehyde, and 4-N,N-divinylamino benzaldehyde;
  N-substituted pyroridone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;
  N-substituted piperidone such as methyl-2-piperidone, N-vinyl-2-piperidone, and N-phenyl-2-piperidone;
  N-substituted lactams such as N-methyl-ε-caprolactam, N-phenyl-ε-caprolactum, N-methyl-ω-laurilolactum, N-vinyl-ω-laurilolactum, N-methyl-ß-propiolactam, and N-phenyl-ß-propiolactam; and
  N,N-bis-(2,3-epoxypropoxy)-aniline, 4,4-methylene-bis-(N,N-glycidylaniline), tris-(2,3-epoxypropyl)-1,3,5-triazine-2,4,6-triones, N,N-diethylacetamide, N-methylmaleimide, N,N-diethylurea, 1,3-dimethylethylene urea, 1,3-divinylethyleneurea, 1,3-diethyl-2-imidazolidinone, 1-methyl-3-ethyl-2-imidazolidinone, 4-N,N-dimethylaminoacetophenone, 4-N,N-diethylaminoacetophenone, 1,3-bis (diphenylamino)-2-propanone, and 1,7-bis(methylethylamino)-4-heptanone. The modification with the above compound (modifying agent) can be carried out by a known method.

As the SBR, for example, SBR manufactured and sold by Sumitomo Chemical Co., Ltd., JSR Corporation, Asahi Kasei Co., Ltd., Zeon Corporation, etc. can be used. The SBR may be used alone or in combination of two or more.

(C) BR

When the rubber composition contains BR, the content of BR in 100% by mass of the rubber component is, for example, more than 5% by mass and less than 100% by mass. The weight average molecular weight of BR is, for example, more than 100,000 and less than 2 million. The amount of vinyl in BR is, for example, more than 1% by mass and less than 30% by mass. The cis amount of BR is, for example, more than 1% by mass and less than 98% by mass. The trans amount of BR is, for example, more than 1% by mass and less than 60% by mass.

The BR is not particularly limited, and BR having a high cis content (cis content of 90% or more), BR having a low cis content, BR containing syndiotactic polybutadiene crystals, and the like can be used. The BR may be either a non-modified BR or a modified BR, and examples of the modified BR include a modified BR into which the above-mentioned functional group has been introduced. These may be used alone or in combination of two or more. The cis content can be measured by infrared absorption spectrum analysis.

As the BR, for example, products of Ube Kosan Co., Ltd., JSR Corporation, Asahi Kasei Co., Ltd., and Nippon Zeon Co., Ltd., etc. can be used.

(B) Compounding Materials Other than Rubber Components (A) Silica

The rubber composition preferably contains silica as a filling reinforcing agent. The BET specific surface area of silica is preferably more than 140 $m^2/g$, more preferably more than 160 $m^2/g$, from the viewpoint of obtaining good durability. On the other hand, from the viewpoint of obtaining good rolling resistance during high-speed running, it is preferably less than 250 $m^2/g$, and more preferably less than 220 $m^2/g$. The above-mentioned BET specific surface area is the value of $N_2SA$ measured by the BET method according to ASTM D3037-93.

When silica is used as the filling reinforcing agent, the content of silica with respect to 100 parts by mass of the rubber component is preferably 35 parts by mass or more, more preferably more than 40 parts by mass. On the other hand, it is preferably 200 parts by mass or less, more preferably 100 parts by mass or less, and further preferably 60 parts by mass or less.

Examples of silica include dry silica (anhydrous silica) and wet silica (hydrous silica). Among them, wet silica is preferable because it has large number of silanol groups.

As the silica, for example, products of Degussa, Rhodia, Tosoh Silica Co., Ltd., Solvay Japan Co., Ltd., Tokuyama Corporation, etc. can be used.

(B) Silane Coupling Agent

The rubber composition preferably contains a silane coupling agent together with silica. The silane coupling agent is not particularly limited. Examples of the silane coupling agent include sulfide-based ones such as bis(3-triethoxysilylpropyl)tetrasulfide, bis (2-triethoxysilylethyl)tetrasulfide, bis (4-triethoxysilylbutyl)tetrasulfide, bis(3-trimethoxysilylpropyl) tetrasulfide, bis(2-trimethoxysilylethyl) tetrasulfide, bis(2-triethoxysilylethyl)trisulfide, bis(4-trimethoxysilylbutyl) trisulfide, bis(3-triethoxysilylpropyl)disulfide, bis(2-triethoxysilylethyl) disulfide, bis(4-triethoxysilylbutyl) disulfide, bis(3-trimethoxysilylpropyl) disulfide, bis(2-trimethoxysilylethyl)disulfide, bis(4-trimethoxysilylbutyl) disulfide, 3-trimethoxysilylpropyl-N,N-dimethylthiocarbamoyltetrasulfide, 2-triethoxysilylethyl-N,N-dimethylthiocarbamoyltetrasulfide, and 3-triethoxysilylpropylmethacrylatemonosulfide;

mercapto-based ones such as 3-mercaptopropyltrimethoxysilane, 2-mercaptoethyltriethoxysilane, and NXT and NXT-Z manufactured by Momentive;

vinyl-based ones such as vinyl triethoxysilane, and vinyl trimethoxysilane;

amino-based ones such as 3-aminopropyltriethoxysilane and 3-aminopropyltrimethoxysilane;

glycidoxy-based ones such as γ-glycidoxypropyltriethoxysilane and γ-glycidoxypropyltrimethoxysilane;

nitro-based ones such as 3-nitropropyltrimethoxysilane, and 3-nitropropyltriethoxysilane; and chloro-based ones such as 3-chloropropyltrimethoxysilane, and 3-chloropropyltriethoxysilane. These may be used alone or in combination of two or more.

As the silane coupling agent, for example, products of Degussa, Momentive, Shinetsu Silicone Co., Ltd., Tokyo Chemical Industry Co., Ltd., Azumax Co., Ltd., Toray Dow Corning Co., Ltd., etc. can be used.

The content of the silane coupling agent is, for example, more than 3 parts by mass and less than 25 parts by mass with respect to 100 parts by mass of silica.

(C) Carbon Black

The rubber composition preferably contains carbon black. The content of carbon black is, for example, more than 1 part by mass and less than 200 parts by mass with respect to 100 parts by mass of the rubber component.

The carbon black is not particularly limited, and examples thereof includes furnace black (furnace carbon black) such as SAF, ISAF, HAF, MAF, FEF, SRF, GPF, APF, FF, CF, SCF and ECF; acetylene black (acetylene carbon black); thermal black (thermal carbon black) such as FT and MT; and channel black (channel carbon black) such as EPC, MPC and CC. These may be used alone or in combination of two or more.

Nitrogen adsorption specific surface area ($N_2SA$) of carbon black is, for example, more than 30 $m^2/g$ and less than 250 $m^2/g$. The amount of dibutyl phthalate (DBP) absorbed by carbon black is, for example, more than 50 ml/100 g and less than 250 ml/100 g. The nitrogen adsorption specific surface area of carbon black is measured according to ASTM D4820-93, and the amount of DBP absorbed is measured according to ASTM D2414-93.

The specific carbon black is not particularly limited, and examples thereof include N134, N110, N220, N234, N219, N339, N330, N326, N351, N550, and N762. Commercially available products include, for example, products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. These may be used alone or in combination of two or more.

(D) Polymer Component

The rubber composition may contain a polymer component other than the rubber component, such as a liquid polymer or a solid polymer.

The liquid polymer is a polymer in a liquid state at room temperature (25° C.), and the solid polymer is a polymer in a solid state at room temperature (25° C.). Examples of liquid polymers and solid polymers include farnesene-based polymers, liquid diene-based polymers, styrene resins, coumarone-indene resins, terpene resins, p-t-butylphenol acetylene resins, phenol resins, C5 resins, C9 resins, C5C9 resin, and acrylic resins.

The farnesene-based polymer is a polymer obtained by polymerizing farnesene, and has a structural unit based on farnesene. Farnesene includes isomers such as a-farnesene ((3E,7E)-3,7,11-trimethyl-1,3,6,10-dodecatetraene) and ß-farnesene (7,11-dimethyl-3-methylene-1,6,10-dodecatorien).

The farnesene-based polymer may be a homopolymer of farnesene (farnesene homopolymer) or a copolymer of farnesene and a vinyl monomer (farnesene-vinyl monomer copolymer).

Examples of vinyl monomers include aromatic vinyl compounds such as styrene, 2-methylstyrene, 3-methylstyrene, 4-methylstyrene, α-methylstyrene, 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl) dimethylaminoethylether, N,N-dimethylaminoethyl styrene, N,N-dimethylaminomethyl styrene, 2-ethyl styrene, 3-ethyl styrene, 4-ethyl styrene, 2-t-butyl styrene, 3-t-butyl styrene, 4-t-butyl styrene, vinyl xylene, vinylnaphthalene, vinyltoluene, vinylpyridine, diphenylethylene, and tertiary amino group-containing diphenylethylene; and conjugated diene compounds such as butadiene and isoprene. These may be used alone or in combination of two or more.

As the farnesene-based polymer, a liquid farnesene-based polymer can be used. The liquid farnesene-based polymer is a farnesene-based polymer that is liquid at room temperature (25° C.) and has a weight average molecular weight (Mw) of more than 3000 and less than 300,000.

The glass transition temperature (Tg) of the farnesene-based polymer is, for example, higher than −100° C. and lower than −10° C. The Tg is a value measured under the condition of a heating rate of 10° C./min using a differential scanning calorimeter (Q200) manufactured by TA Instruments Japan, Inc. in accordance with JIS-K7121: 1987.

The melt viscosity of the farnesene-based polymer is, for example, more than 0.1 Pa·s and less than 500 Pa·s. The melt viscosity is a value measured at 38° C. using a Brookfield type viscometer (manufactured by BROOKFIELD ENGINEERING LABS. INC.).

In the farnesene-vinyl monomer copolymer, the mass-based copolymerization ratio (farnesene/vinyl monomer) of farnesene and the vinyl monomer is, for example, 40/60 to 90/10.

The content of the farnesene-based polymer is, for example, more than 1.0 part by mass and less than 50.0 parts by mass with respect to 100 parts by mass of the rubber component.

As the farnesene-based polymer, for example, a product of Kuraray Co., Ltd., etc. can be used.

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-equivalent weight average molecular weight (Mw) measured by gel permeation chromatography (GPC) of, for example, more than $1.0 \times 10^3$ and less than $2.0 \times 10^5$. In the present specification, Mw of the liquid diene polymer is a polystyrene conversion value measured by gel permeation chromatography (GPC).

The content of the liquid polymer (total content of the liquid farnesene-based polymer, the liquid diene-based polymer, etc.) is, for example, more than 1 part by mass and less than 100 parts by mass with respect to 100 parts by mass of the rubber component.

Coumarone-indene resin is a resin containing coumarone and indene as monomer components constituting the skeleton (main chain) of the resin. Examples of the monomer component contained in the skeleton other than coumarone and indene include styrene, α-methylstyrene, methylindene, and vinyltoluene.

The content of the coumarone-indene resin is, for example, more than 1.0 part by mass and less than 50.0 parts by mass with respect to 100 parts by mass of the rubber component.

The hydroxyl value (OH value) of the coumarone-indene resin is, for example, more than 15 mgKOH/g and less than 150 mgKOH/g. The OH value is the amount of potassium hydroxide required to neutralize acetic acid bonded to a hydroxyl group when 1 g of the resin is acetylated, and is expressed in milligrams. It is a value measured by potentiometric titration method (JIS K 0070: 1992).

The softening point of the coumarone-indene resin is, for example, higher than 30° C. and lower than 160° C. The softening point is the temperature at which the ball drops when the softening point defined in JIS K 6220-1: 2001 is measured by a ring-ball type softening point measuring device.

The styrene resin is a polymer using a styrene monomer as a constituent monomer, and examples thereof include a polymer obtained by polymerizing a styrene monomer as a main component (50% by mass or more). Specifically, it includes homopolymers obtained by individually polymerizing styrene monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.), copolymers obtained by copolymerizing two or more styrene monomers, and, in addition, copolymers obtained by copolymerizing a styrene monomer and other monomers that can be copolymerized with the styrene monomer.

Examples of the other monomers include acrylonitriles such as acrylonitrile and methacrylate; unsaturated carboxylic acids such as acrylic acid and methacrylic acid; unsaturated carboxylic acid esters such as methyl acrylate and methyl methacrylate; dienes such as chloroprene, butadiene, and isoprene, olefins such as 1-butene and 1-pentene; α,ß-unsaturated carboxylic acids such as maleic anhydride and acid anhydrides thereof.

Examples of the terpene resins include polyterpenes, terpene phenols, and aromatic-modified terpene resins. Polyterpene is a resin obtained by polymerizing a terpene compound and a hydrogenated product thereof. The terpene compound is a hydrocarbon having a composition of $(C_5H_8)_n$ or an oxygen-containing derivative thereof.), which is a compound having a terpene classified as monoterpenes $(C_{10}H_{16})$, sesquiterpenes $(C_{15}H_{24})$, diterpenes $(C_{20}H_{32})$, etc. as the basic skeleton. Examples thereof include α-pinene, ß-pinene, dipentene, limonene, myrcene, alloocimene, osimene, α-ferandrene, α-terpinene, γ-terpinene, terpinene, 1,8-cineol, 1,4-cineol, α-terpineol, ß-terpineol, and γ-terpineol.

Examples of the polyterpene include terpene resins such as α-pinene resin, ß-pinene resin, limonene resin, dipentene resin, and ß-pinene/limonene resin, which are made from the above-mentioned terpene compound, as well as hydrogenated terpene resin obtained by hydrogenating the terpene resin. Examples of the terpene phenol include a resin obtained by copolymerizing the above-mentioned terpene compound and the phenol compound, and a resin obtained by hydrogenating above-mentioned resin. Specifically, a resin obtained by condensing the above-mentioned terpene compound, the phenol compound and the formalin is mentioned. Examples of the phenol compound include phenol, bisphenol A, cresol, and xylenol. Examples of the aromatic-modified terpene resin include a resin obtained by modifying a terpene resin with an aromatic compound, and a resin obtained by hydrogenating above-mentioned resin. The aromatic compound is not particularly limited as long as it is a compound having an aromatic ring, and examples thereof include phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthols; styrene derivatives such as styrene, alkylstyrene, alkoxystyrene, unsaturated hydrocarbon group-containing styrene; coumarone; and indene.

The acrylic resin is not particularly limited, but for example, a solvent-free acrylic resin can be used.

As the solvent-free acrylic resin, a (meth) acrylic resin (polymer) synthesized by a high-temperature continuous polymerization method (high-temperature continuous lump polymerization method: a method described in U.S. Pat. No. 4,414,370, JP 84-6207 A, JP 93-58805 A, JP 89-313522 A, U.S. Pat. No. 5,010,166, Toa Synthetic Research Annual Report TREND2000 No. 3 p 42-45, and the like) without using polymerization initiators, chain transfer agents, organic solvents, etc. as auxiliary raw materials as much as possible. In the present invention, (meth) acrylic means methacrylic and acrylic.

Examples of the monomer component constituting the acrylic resin include (meth) acrylic acid, and (meth) acrylic acid derivatives such as (meth) acrylic acid ester (alkyl ester, aryl ester, aralkyl ester, etc.), (meth) acrylamide, and (meth) acrylamide derivative.

In addition, as the monomer component constituting the acrylic resin, aromatic vinyl compounds such as styrene, α-methylstyrene, vinyltoluene, vinylnaphthalene, divinylbenzene, trivinylbenzene, divinylnaphthalene, and the like may be used, together with (meth) acrylic acid or (meth) acrylic acid derivative.

The acrylic resin may be a resin composed of only a (meth) acrylic component or a resin also having a component other than the (meth) acrylic component. Further, the acrylic resin may have a hydroxyl group, a carboxyl group, a silanol group, or the like.

The content of the solid polymer (total content of the solid coumarone-indene resin and the like) is, for example, more than 1.0 part by mass and less than 100.0 parts by mass with respect to 100 parts by mass of the rubber component.

Examples of polymer components of the liquid polymer, the solid polymer, and the like, include products of Maruzen Petrochemical Co., Ltd., Sumitomo Bakelite Co., Ltd., Yasuhara Chemical Co., Ltd., Toso Co., Ltd., Rutgers Chemicals Co., Ltd., BASF Co., Ltd., Arizona Chemical Co., Ltd., Nitto Chemical Co., Ltd., Nippon Catalyst Co., Ltd., JX Energy Co., Ltd., Arakawa Chemical Industry Co., Ltd., Taoka Chemical Industry Co., Ltd., etc.

(E) Oil

The rubber composition may contain oil. Content of the oil is, for example, more than 1.0 part by mass and less than 100.0 parts by mass. The content of the oil also includes the amount of oil contained in rubber (oil spread rubber).

Examples of the oil include process oils, vegetable oils and fats, and mixtures thereof. As the process oil, for example, a paraffinic process oil, an aroma-based process oil, a naphthene process oil, or the like can be used. Examples of the vegetable oils and fats include castor oil, cottonseed oil, sesame oil, rapeseed oil, soybean oil, palm oil, coconut oil, peanut oil, rosin, pine oil, pine tar, tall oil, corn oil, rice oil, beni flower oil, sesame oil, olive oil, sunflower oil, palm kernel oil, camellia oil, jojoba oil, macadamia nut oil, and tung oil. These may be used alone or in combination of two or more.

Examples of oils, which can be used, include products of Idemitsu Kosan Co., Ltd., Sankyo Yuka Kogyo Co., Ltd., Japan Energy Co., Ltd., Orisoi Co., Ltd., H & R Co., Ltd., Toyokuni Seiyu Co., Ltd., Showa Shell Sekiyu Co., Ltd., and Fuji Kosan Co., Ltd.

(F) Low Temperature Plasticizer

The rubber composition may contain a low temperature plasticizer. Examples of the low temperature plasticizer include liquid components such as dioctyl phthalate (DOP), dibutyl phthalate (DBP), tris (2 ethylhexyl) phosphate (TOP), and bis (2 ethylhexyl) sebacate (DOS). When the low-temperature plasticizer is contained, the content with respect to 100 parts by mass of the rubber component is, for example, more than 1 part by mass and less than 60 parts by mass.

(G) Wax

The rubber composition preferably contains wax. Content of the wax is, for example, more than 0.5 parts by mass and less than 20 parts by mass with respect to 100 parts by mass of the rubber component.

The wax is not particularly limited, and examples thereof include petroleum waxes such as paraffin wax and microcrystalline wax; natural waxes such as plant wax and animal wax; and synthetic waxes such as a polymer such as ethylene and propylene. These may be used alone or in combination of two or more.

As the wax, for example, products of Ouchi Shinko Kagaku Kogyo Co., Ltd., Nippon Seiro Co., Ltd., and Seiko Kagaku Co., Ltd. can be used.

(H) Anti-Aging Agent

The rubber composition preferably contains an anti-aging agent. Content of the anti-aging agent is, for example, more than 1 part by mass and less than 10 parts by mass with respect to 100 parts by mass of the rubber component.

Examples of the antiaging agent include naphthylamine-based antiaging agents such as phenyl-α-naphthylamine; diphenylamine-based antiaging agents such as octylated diphenylamine and 4,4'-bis (α,α'-dimethylbenzyl) diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, styrenated phenol; bis, tris, polyphenolic anti-aging agents such as tetrakis-[methylene-3-(3',5'-di-t-butyl-4'-hydroxyphenyl)propionate] methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexis Co., Ltd., etc. can be used.

(I) Stearic Acid

The rubber composition may contain stearic acid. Content of stearic acid is, for example, more than 0.5 parts by mass and less than 10.0 parts by mass with respect to 100 parts by mass of the rubber component. As the stearic acid, conventionally known ones can be used, and, for example, products of NOF Corporation, NOF Corporation, Kao Corporation, Fuji film Wako Pure Chemical Industries, Ltd., and Chiba Fatty Acid Co., Ltd., etc.

can be used.

(J) Zinc Oxide

The rubber composition may contain zinc oxide. Content of zinc oxide is, for example, more than 0.5 parts by mass and less than 10 parts by mass with respect to 100 parts by mass of the rubber component. As the zinc oxide, conventionally known ones can be used, for example, products of Mitsui Metal Mining Co., Ltd., Toho Zinc Co., Ltd., Hakusui Tech Co., Ltd., Shodo Chemical Industry Co., Ltd., Sakai Chemical Industry Co., Ltd., etc. can be used.

(K) Crosslinking Agent and Vulcanization Accelerator

The rubber composition preferably contains a cross-linking agent such as sulfur. Content of the cross-linking agent is, for example, more than 0.1 part by mass and less than 10.0 parts by mass with respect to 100 parts by mass of the rubber component.

Examples of sulfur include powdered sulfur, precipitated sulfur, colloidal sulfur, insoluble sulfur, highly dispersible sulfur, and soluble sulfur, which are commonly used in the rubber industry. These may be used alone or in combination of two or more.

As the sulfur, for example, products of Tsurumi Chemical Industry Co., Ltd., Karuizawa Sulfur Co., Ltd., Shikoku Chemicals Corporation, Flexis Co., Ltd., Nippon Kanryo Kogyo Co., Ltd., Hosoi Chemical Industry Co., Ltd., etc. can be used.

Examples of the cross-linking agent other than sulfur include vulcanizing agents containing a sulfur atom such as Tackilol V200 manufactured by Taoka Chemical Industry Co., Ltd., DURALINK HTS (1,6-hexamethylene-sodium dithiosulfate dihydrate) manufactured by Flexis, and KA9188 (1,6-bis (N,N'-dibenzylthiocarbamoyldithio) hexane) manufactured by Rankses; and organic peroxides such as dicumyl peroxide.

The rubber composition preferably contains a vulcanization accelerator. Content of the vulcanization accelerator is, for example, more than 0.3 parts by mass and less than 10.0 parts by mass with respect to 100 parts by mass of the rubber component.

Examples of the vulcanization accelerator include thiazole-based vulcanization accelerators such as 2-mercaptobenzothiazole, di-2-benzothiazolyl disulfide, and N-cyclohexyl-2-benzothiadylsulfenamide;

thiuram-based vulcanization accelerators such as tetramethylthiuram disulfide (TMTD), tetrabenzyltiuram disulfide (TBzTD), and tetrakis (2-ethylhexyl) thiuram disulfide (TOT-N);

sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotrilguanidine, and orthotrilviguanidine. These may be used alone or in combination of two or more.

(L) Other

In addition to the above components, the rubber composition may further contain additives generally used in the tire industry, for example, fillers such as organic peroxides, calcium carbonate, talc, alumina, clay, aluminum hydroxide, mica, and graphite. Content of these additives is, for example, more than 0.1 part by mass and less than 200 parts by mass with respect to 100 parts by mass of the rubber component.

(2) Production of Tread Rubber Composition

The rubber composition is produced by a general method, for example, a manufacturing method including a base kneading step of kneading a rubber component with a filler such as silica or carbon black, and a finish kneading step of kneading the kneaded product obtained in the base kneading step and a cross-linking agent.

The kneading can be performed using a known (sealed) kneader such as a banbury mixer, a kneader, or an open roll.

The kneading temperature of the base kneading step is, for example, higher than 50° C. and lower than 200° C., and the kneading time is, for example, more than 30 seconds and less than 30 minutes. In the base kneading process, in addition to the above components, compounding agents conventionally used in the rubber industry, such as softeners such as oil, stearic acid, zinc oxide, antiaging agents, waxes, and vulcanization accelerators, may be appropriately added and kneaded as needed.

In the finish kneading step, the kneaded product obtained in the base kneading step and the cross-linking agent are kneaded. The kneading temperature of the finish kneading step is, for example, above room temperature and lower than 80° C., and the kneading time is, for example, more than 1 minute and less than 15 minutes. In the finish kneading step, in addition to the above components, a vulcanization accelerator, zinc oxide and the like may be appropriately added and kneaded as needed.

5. Tire Manufacturing

The tire of the present invention is manufactured by a usual method using an unvulcanized rubber composition obtained through the finish kneading step. That is, the unvulcanized rubber composition is extruded according to the shape of each tire member of the tread, and is molded together with other tire members by a normal method on a tire molding machine to produce an unvulcanized tire.

Specifically, on the molded drum, the inner liner as a member to ensure the airtightness of the tire, the carcass as a member to withstand the load, impact, and filling air pressure received by the tire, a belt as a member to strongly tighten the carcass to increase the rigidity of the tread, and the like are wound, both ends of the carcass are fixed to both side edges, a bead part as a member for fixing the tire to the rim is arranged, and formed into a toroid shape. Then the tread is pasted on the center of the outer circumference, and the sidewall portion as a member that protects the carcass and withstands bending is pasted on the radial outer side to produce an unvulcanized tire.

In the present embodiment, it is preferable to provide with an inclined belt layer that extends at an angle of more than 55° and less than 75° with respect to the tire circumferential direction, as the belt. As a result, the durability of the tire is ensured while the rigidity of the tread can be sufficiently maintained.

Then, the produced unvulcanized tire is heated and pressed in a vulcanizer to obtain a tire. The vulcanization step can be carried out by applying a known vulcanization means. The vulcanization temperature is, for example, higher than 120° C. and lower than 200° C., and the vulcanization time is, for example, more than 5 minutes and less than 15 minutes.

EXAMPLES

Hereinafter, the present invention will be described in more detail with reference to Examples.

[1] Experiment 1

First, tires with different land/sea ratios and tread rubber physical properties were manufactured, and the manufactured tires were installed on passenger cars. Then, running experiments were carried out, and the riding comfort at low temperatures and the steering stability at high-speed running were evaluated.

1. Manufacture of Rubber Compositions for Treads

First, a rubber composition for tread was produced.

(1) Compounding Material

First, each compounding material shown below was prepared.

(a) Rubber Component (A) NR: TSR20

(B-1) SBR1: T3830 (S-SBR, oil-extended product) manufactured by Asahi Kasei Corporation (B-2) SBR2: SBR1723 (E-SBR) manufactured by JSR Corporation
(B-3) SBR3: Nipol NS522 (oil-extended product) manufactured by Nippon Zeon Co., Ltd.
(B-4) SBR4: SLR6430 (S-SBR, oil-extended product) manufactured by Dow Chemical Co., Ltd.
(B-5) SBR5: SYNTION 3041 (oil-extended product) manufactured by Synthos.
(B-6) SBR6: Modified SBR produced according to the method described in the next paragraph.
(Styrene amount: 25% by mass, vinyl bond amount: 60% by mass, Mw: 400,000)
(B-7) SBR7: T4850 manufactured by Asahi Kasei Corporation
(C-1) BR1: BR150 manufactured by Ube Kosan Co., Ltd.
(C-2) BR2: BR360 manufactured by Ube Kosan Co., Ltd.
(C-3) BR3: BR730 manufactured by Ube Kosan Co., Ltd.

The SBR6 was produced according to the procedure shown below. First, cyclohexane, tetrahydrofuran, styrene, and 1,3-butadiene were charged into a nitrogen-substituted autoclave reactor. After adjusting the temperature of the contents of the reactor to 20° C., n-butyllithium was added to initiate polymerization. Polymerization was carried out under adiabatic conditions, and the maximum temperature reached 85° C. When the polymerization conversion reaches 99%, 1,3-butadiene was added, and then further polymerization was carried out for 5 minutes. Thereafter, N,N-bis(trimethylsilyl)-3-aminopropyltriethoxysilane was added as a modifying agent to carry out the reaction. After completion of the polymerization reaction, 2,6-di-tert-butyl-p-cresol was added. Then, the solvent was removed by steam stripping and dried by a heat roll adjusted to 110° C. to obtain SBR6.

(b) Compounding Materials Other than Rubber Components
  (A-1) Silica 1: ZEOSIL 1115 MP manufactured by Rhodia (BET specific surface area: 115 m²/g)
  (A-2) Silica 2: Ultrasil VN3 manufactured by Degussa (BET specific surface area: 167 m²/g)
  (B-1) Silane coupling agent 1: Si266 manufactured by Degussa Co., Ltd. (Bis (3-triethoxysilylpropyl) disulfide)
  (B-2) Silane coupling agent 2: NXT manufactured by Momentive (3-Octanoylthiopropyltriethoxysilane)
  (C) Carbon black: Diamond black N220 manufactured by Mitsubishi Chemical Corporation
  (D) Oil: Process X-140 manufactured by Japan Energy Co., Ltd.
  (E) Resin: YS Polystar U130 manufactured by Yasuhara Chemical Co., Ltd. (Terpene phenol resin)
  (F) Wax: Ozoace 0355 manufactured by Nippon Seiro Co., Ltd.
  (G) Anti-aging agent: Nocrack 6C manufactured by Ouchi Shinko Kagaku Co., Ltd. (N-(1,3-dimethylbutyl)-N'-phenyl-p-phenylenediamine)
  (H) Stearic acid: Stearic acid "TSUBAKI" manufactured by NOF CORPORATION
  (I) Zinc oxide: Two types of zinc oxide manufactured by Mitsui Mining & Smelting Co., Ltd.
  (J) Crosslinking agent and vulcanization accelerator
    Sulfur: Powdered sulfur manufactured by Tsurumi Chemical Industry Co., Ltd.
    Vulcanization accelerator 1: Noxeller NS/CZ manufactured by Ouchi Shinko Chemical Industry Co., Ltd.
      (N-tert-butyl-2-benzothiazolyl sulphenamide/N-cyclohexyl-2-benzothiazolyl sulphenamide)
    Vulcanization accelerator 2: Noxeller DPG manufactured by Ouchi Shinko Chemical Industry Co., Ltd. (1,3-Diphenylguanidine)

(2) Production of Rubber Composition

In accordance with the formulation shown in Table 1, materials other than sulfur and the vulcanization accelerator were kneaded under the conditions of 150° C. for 5 minutes using a Banbury mixer to obtain a kneaded product. Each compounding amount is a mass part.

TABLE 1

| Formulation No. | 1 | 2 | 3 | 4 | 5 | 6 | 7 | 8 |
|---|---|---|---|---|---|---|---|---|
| Rubber components ||||||||| 
| NR |  |  | 10 |  |  |  |  |  |
| SBR1 | 55 |  |  |  |  |  |  |  |
| SBR2 | 34 |  |  |  |  |  |  |  |
| SBR3 |  | 75 |  | 34 | 45 |  |  | 80 |
| SBR4 |  | 45 |  |  | 65 | 76 | 82.5 | 37 |
| SBR5 |  |  | 20.6 |  |  |  |  |  |
| SBR6 |  |  | 50 |  |  |  |  |  |
| SBR7 |  |  | 82.5 |  |  | 45 |  |  |
| BR1 |  | 20 | 20 |  |  |  | 15 |  |
| BR2 | 35 |  |  | 25 | 20 |  |  |  |
| BR3 |  |  |  |  |  |  | 40 | 15 |
| Other compounding materials ||||||||| 
| Silica 1 |  |  | 50 |  |  |  | 20 |  |
| Silica 2 | 80 | 90 |  | 95 | 100 | 50 | 80 | 100 |
| Silane coupling agent 1 | 7.2 |  | 3.5 | 8.6 | 5.0 | 3.5 | 4.0 | 3.0 |
| Silane coupling agent 2 |  | 7.2 |  |  | 5.0 |  | 5.0 | 7.0 |
| Carbon black | 20 | 5 | 45 | 15 | 20 | 85 | 20 | 15 |
| Oil | 10 | 10 | 10 | 25 | 23 | 25 | 10 | 23 |
| Resin | 10 | 10 |  | 10 | 15 | 30 | 30 | 20 |
| Wax | 2.5 | 2.5 | 2.5 | 2.5 | 2.5 | 2.5 | 2.5 | 2.5 |
| Anti-aging agent | 3.5 | 3.5 | 3.5 | 3.5 | 3.5 | 3.5 | 3.5 | 3.5 |
| Stearic acid | 2.5 | 2.5 | 2.5 | 2.5 | 2.5 | 2.5 | 2.5 | 2.5 |
| Zinc oxide | 2 | 2 | 2 | 2 | 2 | 2 | 2 | 2 |

TABLE 1-continued

| Formulation No. | Formulation | | | | | | | |
|---|---|---|---|---|---|---|---|---|
| | 1 | 2 | 3 | 4 | 5 | 6 | 7 | 8 |
| Crosslinking agent and vulcanization accelerator | | | | | | | | |
| Sulfur | 1.5 | 1.8 | 1.8 | 1.5 | 1.5 | 1.8 | 1.5 | 1.5 |
| Vulcanization accelerator 1 | 1.8 | 2.5 | 2.0 | 2.0 | 2.5 | 2.5 | 2.5 | 2.5 |
| Vulcanization accelerator 2 | 2.0 | 2.5 | 1.5 | 2.5 | 2.5 | 1.5 | 2.5 | 3.0 |
| Physical properties of the tread | | | | | | | | |
| (A)50° C. tanδ | 0.20 | 0.15 | 0.20 | 0.21 | 0.19 | 0.36 | 0.09 | 0.05 |
| (B)20° C. tanδ | 0.30 | 0.20 | 0.30 | 0.30 | 0.30 | 0.50 | 0.25 | 0.25 |
| (C)5° C. tanδ | 0.40 | 0.70 | 0.50 | 0.61 | 0.69 | 1.00 | 0.90 | 1.00 |
| |(B) − (A)| | 0.10 | 0.05 | 0.10 | 0.09 | 0.11 | 0.14 | 0.16 | 0.20 |
| |(C) − (B)| | 0.10 | 0.50 | 0.20 | 0.31 | 0.39 | 0.50 | 0.65 | 0.75 |

2. Tire Manufacturing

Next, sulfur and a vulcanization accelerator were added to the obtained rubber composition for tread and kneaded under the conditions of 80° C. for 5 minutes using an open roll to obtain an unvulcanized rubber composition. The obtained unvulcanized rubber composition was formed into a tread so as to have each land/sea ratio shown in Tables 2 and 3, and then bonded together with other tire members to form an unvulcanized tire. The formed unvulcanized tire was pressed at 170° C. for 10 minutes and vulcanized to produce a test tire (size: 175/80R16 91S, cross-sectional width Wt: 175 mm, outer diameter Dt: 689 mm, $(Dt^2 \times \pi/4)/Wt=2130.5$). The number of main grooves in the circumferential direction was set to four.

3. Performance Evaluation Test (1) Physical Properties of the Tread

A viscoelasticity measurement sample having a length of 20 mm, a width of 4 mm, and a thickness of 1 mm was collected from the inside of the rubber layer of the tread portion of each test tire so that the tire circumference direction was the long side. Using "Iplexer (registered trademark)" manufactured by GABO, loss tangent (tan δ) at temperature of 5° C., 20° C., or 50° C. under the conditions of frequency 10 Hz, initial strain 2%, and dynamic strain rate 1%, was measured, respectively. The results are also shown in Table 1. The thickness direction of the sample is the tire radial direction, and each measurement result is an average value of the values measured from each sample having the same composition.

(2) Riding Comfort Evaluation Test at Low Temperature

Each test tire was installed on all wheels of the vehicle (domestic FF vehicle, displacement 2000 cc) and ran on a dry asphalt road surface test course at a speed of 40 km/h for 2 hours (80 km) in an environment of 5° C. The riding comfort at that time was sensory evaluated by the drivers. For the evaluation, the total value of the five-level evaluation by 10 drivers (from 1 point to 5 points, the higher the score is better) was calculated, and the evaluation was made by indexing by the following formula. The higher the number, the better the riding comfort at low temperatures.

Low temperature riding comfort=[(Total evaluation value of test tire)/(Total evaluation value of Comparative Example 1)]×100

(3) Steering Stability Evaluation Test at a High-Speed Running

Each test tire was installed to all wheels of the vehicle (domestic FF vehicle, displacement 2000 cc), and the vehicle lapped the test course on the dry asphalt road surface at a speed of 80 km/h, and the lap time at that time was measured for the evaluation. The evaluation was indexed by the following formula based on the difference from the lap time of the reference tire prepared separately. The larger the value, the better the handling characteristics and the better the steering stability.

Steering stability=[(Lap time of test tire−Lap time of reference tire)/(Lap time of Comparative Example 1−Lap time of reference tire)]×100

(4) Evaluation Result

Tables 2 and 3 show the results of the riding comfort evaluation test at a low temperature and the steering stability evaluation test at a high-speed running. Then, a comprehensive evaluation is made based on the sum of the indices of both.

TABLE 2-1

| | Example No | | | | | | | | |
|---|---|---|---|---|---|---|---|---|---|
| | 1 | 2 | 3 | 4 | 5 | 6 | 7 | 8 | 9 |
| | Formulation No | | | | | | | | |
| Tread formulation | 2 | 2 | 2 | 3 | 3 | 3 | 4 | 4 | 4 |
| [Tread shape] | | | | | | | | | |
| Number of main grooves | 4 | 4 | 4 | 4 | 4 | 4 | 4 | 4 | 4 |
| land/sea ratio (%) | 60 | 70 | 80 | 60 | 70 | 80 | 60 | 70 | 80 |
| [Evaluation results] | | | | | | | | | |
| Riding comfort at low temperature | 103 | 107 | 110 | 108 | 118 | 122 | 109 | 118 | 120 |

TABLE 2-1-continued

| | Example No | | | | | | | | |
|---|---|---|---|---|---|---|---|---|---|
| | 1 | 2 | 3 | 4 | 5 | 6 | 7 | 8 | 9 |
| | | | | Formulation No | | | | | |
| Tread formulation | 2 | 2 | 2 | 3 | 3 | 3 | 4 | 4 | 4 |
| Steering stability at high-speed running | 106 | 111 | 116 | 120 | 126 | 130 | 118 | 124 | 127 |
| Comprehensive evaluation | 209 | 218 | 226 | 228 | 244 | 252 | 227 | 242 | 247 | and

TABLE 2-2

| | Example No | | | | | |
|---|---|---|---|---|---|---|
| | 10 | 11 | 12 | 13 | 14 | 15 |
| | | | Formulation No | | | |
| Tread formulation | 5 | 5 | 5 | 6 | 6 | 6 |
| [Tread shape] | | | | | | |
| Number of main grooves | 4 | 4 | 4 | 4 | 4 | 4 |
| land/sea ratio (%) | 60 | 70 | 80 | 60 | 70 | 80 |
| [Evaluation results] | | | | | | |
| Riding comfort at low temperature | 114 | 118 | 120 | 104 | 106 | 112 |
| Steering stability at high-speed running | 120 | 124 | 125 | 117 | 119 | 119 |
| Comprehensive evaluation | 234 | 242 | 245 | 221 | 225 | 231 |

TABLE 3

| | Comparative example No. | | | | | | |
|---|---|---|---|---|---|---|---|
| | 1 | 2 | 3 | 4 | 5 | 6 | 7 |
| | | | | Formulation No | | | |
| Tread formulation | 6 | 1 | 2 | 2 | 6 | 7 | 8 |
| [Tread shape] | | | | | | | |
| Number of main grooves | 4 | 4 | 4 | 4 | 4 | 4 | 4 |
| land/sea ratio (%) | 85 | 65 | 55 | 85 | 55 | 80 | 80 |
| [Evaluation results] | | | | | | | |
| Riding comfort at low temperature | 100 | 74 | 85 | 90 | 93 | 74 | 68 |
| Steering stability at high-speed running | 100 | 101 | 99 | 101 | 102 | 99 | 96 |

TABLE 3-continued

| | Comparative example No. | | | | | | |
|---|---|---|---|---|---|---|---|
| | 1 | 2 | 3 | 4 | 5 | 6 | 7 |
| | | | | Formulation No | | | |
| Tread formulation | 6 | 1 | 2 | 2 | 6 | 7 | 8 |
| Comprehensive evaluation | 200 | 175 | 184 | 191 | 195 | 173 | 164 |

From Tables 2 and 3, when the land/sea ratio is more than 55% and less than 85%, and when, in the tread rubber composition, |20° C. tan δ-50° C. tan δ| is 0.01 or more and less than 0.15 and |5° C. tan δ-20° C. tan δ| is more than 0.15 and less than 0.70, both the riding comfort at low temperature and the steering stability at high-speed running exceed the index 100, and the result of the comprehensive evaluation shows that it is possible to provide tires that have both riding comfort at low temperatures and steering stability at high-speed running. When |20° C. tan δ-50° C. tan δ| is more than 0.08 and less than 0.12, and |5° C. tan δ-20° C. tan δ| is more than 0.30 and less than 0.40, it is shown that it is possible to provide a tire that is more compatible with both riding comfort at low temperature and steering stability at high-speed running.

[2] Experiment 2

1. Experimental Method

According to the same manner as in Experiment 1, except that the number of circumferential main grooves is set to 1, 2, 3, and 4, and the difference in the average value of the contact area (average tread area) per unit length in the tire circumferential direction in the area partitioned by the circumferential main grooves was changed to the values shown in Table 4, tires were manufactured and evaluated. The rubber composition of Formulation 2 was used for the tread rubber, and the land/sea ratio was fixed at 80%.

2. Evaluation Results

The results of the evaluation are shown in Table 4. In this experiment, the result of the tire of Example 16 was evaluated as the reference (evaluation value: 100), unlike Experiment 1, wherein the evaluation was made as the result of the tire of Comparative Example 1 was evaluated as the reference.

TABLE 4

| | Example No. | | | | | | | | | |
|---|---|---|---|---|---|---|---|---|---|---|
| | 16 | 17 | 18 | 19 | 20 | 21 | 22 | 23 | 24 | 25 |
| Number of circumferential main grooves | 2 | 2 | 2 | 3 | 3 | 3 | 4 | 4 | 4 | 1 |

TABLE 4-continued

|  | Example No. | | | | | | | | | |
| --- | --- | --- | --- | --- | --- | --- | --- | --- | --- | --- |
|  | 16 | 17 | 18 | 19 | 20 | 21 | 22 | 23 | 24 | 25 |
| Difference in average tread area (%) | 10 | 15 | 20 | 10 | 15 | 20 | 10 | 15 | 20 | 15 |
| Riding comfort at low temperature | 100 | 100 | 103 | 100 | 106 | 106 | 109 | 103 | 103 | 100 |
| Steering stability at high-speed running | 100 | 103 | 101 | 103 | 102 | 101 | 105 | 103 | 100 | 102 |
| Comprehensive evaluation | 200 | 203 | 204 | 203 | 208 | 207 | 214 | 206 | 203 | 202 |

From Table 4, if the number of main grooves in the circumferential direction is one or more, both riding comfort at low temperature and steering stability at high-speed running can be achieved. In addition, it is shown that both the riding comfort at low temperature and the steering stability at high speed can be achieved at a higher level, when the number is three or more and the difference in average tread area is 15% or less.

[3] Experiment 3
1. Experimental Method

Next, according to the same manner, except that the number of circumferential main grooves is set to four, two center main grooves and two shoulder main grooves, and the groove width of the shoulder main groove, the position of the center of the groove width (the ratio of the distance from the tread ground contact end to the ground contact width), and the area ratio of the center land area to the entire land area of tire contact area were changed as shown in Table 5, the tires were produced and evaluated in the same manner. Compound 5 was used for the tread rubber.

2. Evaluation Results

The results of the evaluation are shown in Table 5. In this experiment, the result of the tire of Example 26 was evaluated as the reference (evaluation value: 100), unlike Experiment 1, wherein the evaluation was made as the result of the tire of Comparative Example 1 was evaluated as the reference.

From Table 5, when the groove width of the shoulder main groove is more than 4 mm and less than 20 mm, and the center of the groove width is on the center side of the 25% width position of the ground contact width from the tread ground contact end, and the area ratio of the center land area is 40% or more, it is shown that both the riding comfort at low temperature and the steering stability at high-speed running can be achieved at a higher level.

[4] Experiment 4
1. Experimental Method

Next, as shown in Table 6, a tire having a tread portion having a two-layer structure of a cap rubber layer and a base rubber layer having different formulations was produced and evaluated in the same manner. The number of main grooves in the circumferential direction was set to 4, and the land/sea ratio was set to 80%.

2. Evaluation Results

The results of the evaluation are shown in Table 6. In Table 6, the hardness (JIS A hardness) measured by pressing the type A durometer against the sample from the ground surface side at 23° C. in accordance with JIS K6253, using the hardness measurement samples cut out from the cap rubber layer and the base rubber layer, is also shown. In this experiment, the result of the tire of Example 28 was evaluated as the reference (evaluation value: 100), unlike Experiment 1, wherein the evaluation was made as the result of the tire of Comparative Example 1 was evaluated as the reference.

TABLE 5

|  | Example No. | | | | | | | | | |
| --- | --- | --- | --- | --- | --- | --- | --- | --- | --- | --- |
|  | 26 | 27 | 28 | 29 | 30 | 31 | 32 | 33 | 34 | 35 |
| [Tread shape] | | | | | | | | | | |
| Groove width of shoulder main groove (mm) | 3 | 5 | 5 | 10 | 10 | 10 | 15 | 18 | 20 | 25 |
| Position of the center of the groove width (%) | 25 | 20 | 25 | 25 | 28 | 28 | 28 | 30 | 28 | 28 |
| Area of center Land area (%) | 45 | 45 | 45 | 45 | 35 | 40 | 45 | 50 | 45 | 45 |
| [Experimental results] | | | | | | | | | | |
| Riding comfort at low temperature | 100 | 100 | 103 | 113 | 105 | 105 | 109 | 110 | 103 | 103 |
| Steering stability at high-speed running | 100 | 102 | 104 | 106 | 102 | 104 | 104 | 104 | 103 | 102 |
| Comprehensive evaluation | 200 | 202 | 207 | 219 | 207 | 209 | 213 | 214 | 206 | 205 |

TABLE 6

| | Example No. | | | | | | | |
|---|---|---|---|---|---|---|---|---|
| | 36 | 37 | 38 | 39 | 40 | 41 | 42 | 43 |
| [Tread formulation] (Formulation No.) | | | | | | | | |
| Cap rubber layer | 2 | 2 | 2 | 4 | 5 | 6 | 6 | 6 |
| Base rubber layer | 2 | 3 | 4 | 3 | 4 | 3 | 4 | 5 |// 
| [JIS A hardness] | | | | | | | | |
| Cap rubber layer | 47 | 47 | 47 | 30 | 60 | 73 | 73 | 73 |
| Base rubber layer | 45 | 20 | 30 | 20 | 30 | 20 | 30 | 60 |
| [Experimental results] | | | | | | | | |
| Riding comfort at low temperature | 100 | 116 | 116 | 105 | 119 | 119 | 119 | 116 |
| Steering stability at high-speed running | 100 | 107 | 112 | 105 | 107 | 109 | 107 | 105 |
| Comprehensive evaluation | 200 | 223 | 228 | 210 | 226 | 228 | 226 | 221 |

From Table 6, when the tread running surface is composed of a cap rubber layer and a base rubber layer, the hardness of the cap rubber layer is higher than the hardness of the base rubber layer, and the JIS A hardness is more than 45 and less than 75, it is shown that both the riding comfort at low temperature and the steering stability at high-speed running can be achieved at a higher level.

[5] Experiment 5

1. Experimental Method

In the above experiments 1 to 4, the tire size was fixed to 175/80R16 and the experiment was performed. Next, the tire size, that is, $(Dt^2 \times \pi/4)/Wt$ was changed, and the evaluation was performed according to the same manner. The rubber composition of Formulation 2 was used for the tread rubber, the number of main grooves in the circumferential direction was fixed at 4, the land/sea ratio was fixed at 80%, and the difference in the average tread area was fixed at 20%.

Further, in each test tire, the above-mentioned $(L_{80}/L_0)$ is set to 0.5, and the total volume of the lateral grooves including lateral groove having a groove width/groove depth of 0.65 was set to 3.5% of the volume of the tread portion.

2. Evaluation Results

The results of the evaluation are shown in Table 7. In this experiment, the result of the tire of Comparative Example 8 was evaluated as the reference (evaluation value: 100), unlike Experiment 1, wherein the evaluation was made as the result of the tire of Comparative Example 1 was evaluated as the reference.

TABLE 7

| | Comparative Example 8 | Example 36 | Example 37 | Example 38 | Comparative Example 9 |
|---|---|---|---|---|---|
| Tire size | 245/45R22 | 205/65R18 | 175/55R19 | 145/60R22 | 155/50R24 |
| Outer diameter Dt(mm) | 779 | 723 | 675 | 733 | 766 |
| Cross-sectional width Wt (mm) | 243 | 209 | 182 | 150 | 162 |
| $(Dt^2 \times \pi/4)/Wt$ | 1961.4 | 1964.4 | 1966.2 | 2813.2 | 2844.7 |
| $(Dt - 2 \times Ht)$ | 559 | 457 | 483 | 559 | 610 |
| Riding comfort at low temperature | 100 | 105 | 107 | 106 | 96 |
| Steering stability at high-speed running | 100 | 105 | 108 | 105 | 101 |
| Comprehensive evaluation | 200 | 210 | 215 | 211 | 197 |

From Table 7, under the conditions that the land/sea ratio is more than 55% and less than 85%, the number of circumferential main grooves is one or more, when $1963.4 \leq (Dt^2 \times \pi/4)/Wt \leq 2827.4$ is satisfied, it is shown that both the riding comfort at low temperature and the steering stability at high-speed running can be achieved. At this time, when $(Dt-2 \times Ht)$ is 470 (mm) or more, it is shown that both the riding comfort at low temperature and the steering stability at high-speed running can be achieved at a higher level.

Although the present invention has been described above based on the embodiments, the present invention is not limited to the above embodiments. Various modifications can be made to the above embodiments within the same and equal range as the present invention.

What is claimed is:

1. A pneumatic radial tire for a passenger car including a carcass having a radial arrangement cord straddling a pair of bead portions in a toroidal shape and a tread provided on the outer side of the carcass in the radial direction of the tire, in which the tread satisfies, when the tire is installed on a standardized rim and the internal pressure is the standardized internal pressure, the cross-sectional width of the tire is Wt mm and the outer diameter is Dt mm, $1963.4 \leq (Dt^2 \times \pi/4)/Wt \leq 2827$, and has at least one main groove extending in the circumferential direction of the tread on the tread running surface;

the land/sea ratio on the tread running surface is more than 55% and less than 85%; and regarding loss tangent (tan δ) of the rubber composition forming the tread measured under the conditions of a frequency of 10 Hz, an initial strain of 2%, and a dynamic strain rate of 1%,

|20° C. tan δ-50° C. tan δ| is 0.01 or more and less than 0.15, and

|5° C. tan δ-20° C. tan δ| is more than 0.15 and less than 0.70 wherein the tread has a tread pattern and is divided into a center land region and both shoulder land regions by a pair of shoulder main grooves extending continuously along the tire circumferential direction across the center line passing through the axial center of the tread pattern, and has multiple lateral grooves extending in the tire axial direction; and the total volume of the plurality of lateral grooves is 2.0 to 5.0% of the volume of the tread.

2. The pneumatic radial tire for a passenger car according to claim 1, wherein the |20° C. tan δ-50° C. tan δ| is more than 0.08 and less than 0.12.

3. The pneumatic radial tire for a passenger car according to claim 1, wherein the |5° C. tan δ-20° C. tan δ| is more than 0.30 and less than 0.40.

4. The pneumatic radial tire for a passenger car according to claim 1, wherein
the tread is divided into four or more regions in the tire axial direction by three or more main grooves and a pair of ground contact ends; and
a difference in the average tread area per unit length in the tire circumferential direction is 15% or less in each of the four or more regions.

5. The pneumatic radial tire for a passenger car according to claim 1, wherein
each shoulder main groove has a groove width of more than 4 mm and less than 20 mm, and the center of the groove width is on the center side of the 25% width position of the ground contact width from the tread ground contact end; and
center land area of the center land region has an area of 40% or more of the entire land area of the tire contact area.

6. The pneumatic radial tire for a passenger car according to claim 5, wherein the center land region is provided with a lateral groove and/or a lateral sipe extending in a direction crossing a land portion.

7. The pneumatic radial tire for a passenger car according to claim 1, wherein
the tread is composed of a cap rubber layer constituting the tread running surface and a base rubber layer located inside the cap rubber layer;
the hardness of the cap rubber layer is higher than the hardness of the base rubber layer, and has the JIS A hardness of more than 45 and less than 75.

8. The pneumatic radial tire for a passenger car according to claim 7, wherein the aspect ratio is 47.5% or more.

9. The pneumatic radial tire for a passenger car according to claim 8, wherein the aspect ratio is 50% or more.

10. The pneumatic radial tire for a passenger car according to claim 1, wherein the rubber composition forming the tread contains
35% by mass or more of diene-based rubber as a rubber component; and
35 parts by mass or more, with respect to 100 parts by mass of the rubber component, of silica having a BET specific surface area of more than 140 $m^2/g$ and less than 250 $m^2/g$.

11. The pneumatic radial tire for a passenger car according to claim 1, wherein,
when the outer diameter of the tire is Dt mm and the cross-sectional height of the tire is Ht mm, when the tire is installed on a standardized rim and the internal pressure is 250 kPa, (Dt−2×Ht) is 470 mm or more.

12. The pneumatic radial tire for a passenger car according to claim 1, wherein the aspect ratio is 40% or more.

13. The pneumatic radial tire for a passenger car according to claim 12, wherein the aspect ratio is 45% or more.

14. The pneumatic radial tire for a passenger car according to claim 1, wherein
the ratio of $L_{80}$, the groove width at a depth of 80% of the maximum depth of the main groove extending in the circumferential direction of the tread, to $L_0$, the groove width of the main groove on the contact area of the main groove ($L_{80}/L_0$) is 0.3 to 0.7.

15. The pneumatic radial tire for a passenger car according to claim 1, wherein at least one of the lateral grooves is a lateral groove having a groove width/groove depth of 0.50 to 0.80.

16. The pneumatic radial tire for a passenger car according to claim 1, wherein,
when the outer diameter of the tire is Dt mm when the tire is installed on a standardized rim and the internal pressure is 250 kPa, the Dt is less than 685 mm.

17. The pneumatic radial tire for a passenger car according to claim 1, wherein the cross-sectional width Wt is less than 205 mm.

18. The pneumatic radial tire for a passenger car according to claim 17, wherein the cross-sectional width Wt is less than 200 mm.

* * * * *